United States Patent
Lee

(10) Patent No.: US 9,121,783 B2
(45) Date of Patent: Sep. 1, 2015

(54) TORQUE SENSOR ROTOR

(71) Applicant: LG INNOTEK CO., LTD., Seoul (KR)

(72) Inventor: Changhwan Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/280,367

(22) Filed: May 16, 2014

(65) Prior Publication Data
US 2014/0251028 A1    Sep. 11, 2014

Related U.S. Application Data

(63) Continuation of application No. 13/923,865, filed on Jun. 21, 2013, now Pat. No. 8,776,618, which is a continuation of application No. 13/455,591, filed on Apr. 25, 2012, now Pat. No. 8,584,532.

(30) Foreign Application Priority Data

Apr. 25, 2011    (KR) .................. 10-2011-0038654

(51) Int. Cl.
*G01L 3/00* (2006.01)
*G01L 3/02* (2006.01)
*G01L 3/04* (2006.01)
*G01L 25/00* (2006.01)
*G01L 3/10* (2006.01)

(52) U.S. Cl.
CPC . *G01L 3/04* (2013.01); *G01L 3/104* (2013.01); *G01L 25/003* (2013.01)

(58) Field of Classification Search
USPC ....................................... 73/862.191, 862.08
See application file for complete search history.

(56) References Cited

U.S. PATENT DOCUMENTS

| | | | | |
|---|---|---|---|---|
| 5,197,338 A * | 3/1993 | Heiman et al. | ............. | 73/862.29 |
| 8,584,532 B2 * | 11/2013 | Lee | ............. | 73/862.191 |
| 2010/0244606 A1* | 9/2010 | Kim | ............. | 310/156.13 |

FOREIGN PATENT DOCUMENTS

| | | |
|---|---|---|
| CN | 101854097 A | 10/2010 |
| CN | 101949750 A | 1/2011 |
| JP | 3514426 B2 | 3/2004 |
| WO | WO 2010/128820 A2 | 11/2010 |

OTHER PUBLICATIONS

United States Notice of Allowance dated Jul. 22, 2013 issued in U.S. Appl. No. 13/455,591.
Chinese Office Action dated Jan. 10, 2014 issued in Application No. 2012101235240 (with English translation).
United States Notice of Allowance dated Feb. 18, 2014 issued in U.S. Appl. No. 13/923,865.

* cited by examiner

*Primary Examiner* — Lisa Caputo
*Assistant Examiner* — Jamel Williams
(74) *Attorney, Agent, or Firm* — Ked & Associates, LLP

(57) ABSTRACT

Disclosed is a rotor for a torque sensor configured to improve a mechanical coupling force with respect to a jig in a process of adjusting a torque center, thus enabling a fine adjustment, the rotor including a rotor body having a sleeve coupled to a rotating shaft and a yoke protruding from an outer circumference of the sleeve, a ring-shaped magnet coupled to an outer circumference of the yoke, and an anti-slip structure formed on the rotor body and partially coming into contact with a jig during a rotating process for adjusting a torque center, thus inhibiting slipping between the rotor body and the jig when a rotating force is transmitted, so that slipping between the jig and the rotor body is inhibited to enable precise transmission of the rotating force whereby accuracy is improved during fine adjustment of the torque center.

16 Claims, 2 Drawing Sheets

TORQUE SENSOR ROTOR

CROSS-REFERENCE TO RELATED APPLICATIONS

This application is a Continuation Application of prior U.S. patent application Ser. No. 13/923,865 filed Jun. 21, 2013, which is a Continuation Application of prior U.S. patent application Ser. No. 13/455,591 filed Apr. 25, 2012, which claims priority under 35 U.S.C. §119 to Korean Application No. 10-2011-0038654 filed on Apr. 25, 2011, whose entire disclosures are hereby incorporated by reference.

BACKGROUND

1. Field

The present invention relates generally to a rotor for a torque sensor and, more particularly, to a rotor for a torque sensor, configured to improve a mechanical coupling force with respect to a jig in a process of adjusting a torque center, thus enabling a fine adjustment.

2. Background

Generally, a vehicle is configured to change a driving direction by manipulating a steering wheel connected to a wheel. However, if resistance between the wheel and a road is large or there is an obstacle to steering, a manipulation force is decreased, thus making it difficult to rapidly manipulate. In order to solve the problem, a power steering system has been used. Such a power steering system includes a power unit to manipulate the steering wheel, thus reducing a manipulation force.

In order for the power unit to assist in manipulating the steering wheel, it is necessary to measure torque acting on a steering shaft. Thus, several types of devices are used to measure torque of the steering wheel. Among them, a device detecting torque by measuring a magnetic field relative to a magnet coupled to the steering shaft has been widely used because it is more economical.

A general steering structure includes an input shaft to which a steering wheel is coupled, an output shaft coupled to a pinion engaging with a rack bar of a wheel, and a torsion bar connecting the input shaft and the output shaft.

If the steering wheel rotates, a rotating force is transmitted to the output shaft, and the wheel changes its direction by interaction between the pinion and the rack bar. Here, the larger resistance is, the more the input shaft rotates. Hence, the torsion bar is twisted. A degree to which the torsion bar is twisted is measured by the torque sensor using the magnetic field.

When the steering wheel is not manipulated, the torque sensor maintains a central position. If a set center is erroneous, there occurs a difference in auxiliary steering force between left and right sides during a manipulation of the steering wheel. Thus, as for the power steering system, it is very important to adjust the center of the torque sensor.

FIG. 1 is a perspective view showing a conventional rotor for a torque sensor.

A rotor 1 having a magnet 2 is coupled to an input shaft of a steering system, and a stator (not shown) is coupled to an output shaft.

If the torsion bar is twisted by a difference in rotation amount between the input shaft coupled to the rotor 1 and the output shaft coupled to the stator, the magnet 2 and the stator rotate relative to each other. At this time, opposite surfaces between the magnet 2 and the stator are changed, so that a magnetization value is changed, and thereby torque may be measured using the change in magnetization value.

The rotor 1 includes a sleeve 4 coupled to an outer circumference of the input shaft, and a yoke 3 coupled with the sleeve 4 to allow the magnet 2 to be coupled to an outer circumference thereof.

In order to adjust the center of the torque sensor, there has been used a method of holding a predetermined portion on the outer circumference of the sleeve 4 by a jig and then rotating the rotor 1 by a frictional force.

However, such a method is problematic in that the jig rotates the outer circumference of the sleeve by the frictional force, so that there is a relatively strong possibility that the jig will slip from the sleeve, and it is difficult to finely adjust the center.

The above references are incorporated by reference herein where appropriate for appropriate teachings of additional or alternative details, features and/or technical background.

SUMMARY

Accordingly, the present invention has been made keeping in mind the above problems occurring in the prior art, and an object of the present invention is to provide a rotor for a torque sensor, capable of more precisely performing a center adjusting operation.

According to one aspect of this invention, there is provided a rotor for a torque sensor, the rotor comprising: a rotor body including a sleeve coupled to a rotating shaft, and a yoke protruding from an outer circumference of the sleeve; a ring-shaped magnet coupled to an outer circumference of the yoke; and an anti-slip structure formed on the rotor body and partially coming into contact with a jig during a rotating process for adjusting a torque center, thus inhibiting slipping between the rotor body and the jig when a rotating force is transmitted. Thus, slipping between the jig and the rotor body is inhibited to enable precise transmission of the rotating force, so that accuracy is improved during fine adjustment of the torque center.

Further, the anti-slip structure may include a serration formed on an upper end of the yoke in a circumferential direction thereof, the serration coming into contact with a lower end of the jig during the rotating process for adjusting the center, thus transmitting the rotating force from the jig to the yoke. Thus, the jig is brought into contact with the yoke, thus allowing the rotating force to be reliably transmitted when the center is adjusted.

Further, the anti-slip structure may include a hole formed in the outer circumference of the sleeve, and a protrusion formed on the jig is inserted into the hole, thus transmitting the rotating force from the jig to the sleeve. Thus, the jig comes into contact with the sleeve, thus allowing the rotating force to be more reliably transmitted when the center is adjusted.

Further, the anti-slip structure may include a knurled portion formed on the outer circumference of the sleeve, and the jig partially comes into contact with the knurled portion of the sleeve, thus transmitting the rotating force from the jig to the sleeve. Thus, a frictional force between the sleeve and the jig is improved, thus allowing the rotating force to be reliably transmitted.

Further, the anti-slip structure may include a depression formed downwards from an upper end of the sleeve, and a protrusion formed on the jig is inserted into the depression, thus transmitting the rotating force from the jig to the sleeve. Thus, a mechanical coupling force between the sleeve and the jig is excellent.

Meanwhile, according to another aspect of this invention, there is provided a rotor for a torque sensor, the rotor comprising: a rotor body coupled to a rotating shaft; a ring-shaped magnet disposed to protrude to an outer circumference of the rotor body; and an anti-slip structure formed on the rotor body, wherein during a rotating process for adjusting a torque center, a jig comes into contact with the outer circumference of the rotor body or an upper portion of the magnet, and the anti-slip structure is formed on a surface making contact with the jig, thus inhibiting slipping between the jig and the rotor body. Thus, a frictional force between contact portions of the jig and the rotor is improved, so that the accuracy of a center adjustment is improved.

A rotor for a torque sensor according to the present invention constructed as described above is advantageous in that a frictional force is increased at a portion coupled with a jig when a center of the rotor is adjusted, thus providing various structures that enable precise transmission of a rotating force, and thereby permitting a fine adjustment of the torque center, therefore improving operational reliability of a steering system.

BRIEF DESCRIPTION OF THE DRAWINGS

The embodiments will be described in detail with reference to the following drawings in which like reference numerals refer to like elements wherein.

DETAILED DESCRIPTION

Hereinafter, a rotor for a torque sensor according to the preferred embodiment of the present invention will be described in detail with reference to the accompanying drawings.

Figure 1:
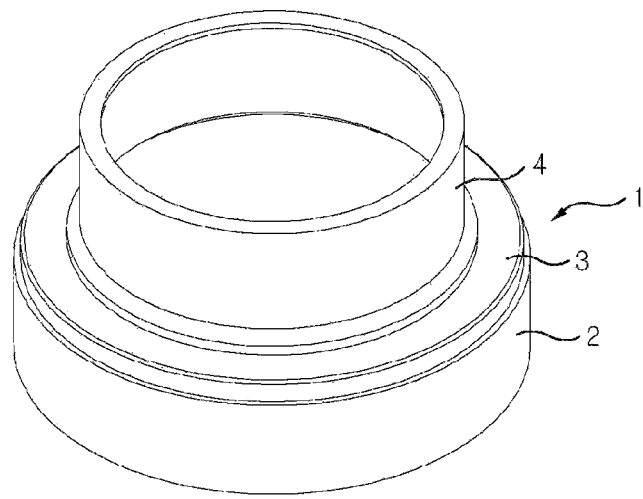
FIG. 1 is a perspective view showing a conventional rotor for a torque sensor.
Figure 2:
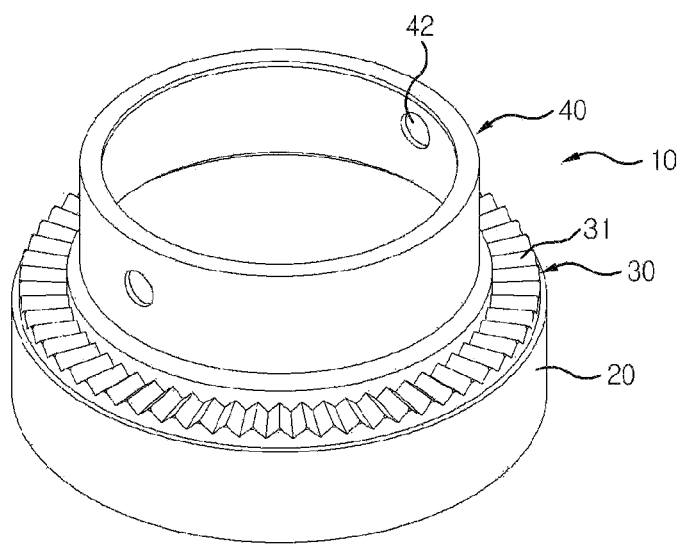
FIG. 2 is a perspective view showing a rotor for a torque sensor according to the present invention.

FIG. 2 is a perspective view showing a rotor for a torque sensor according to the present invention.

A magnet 20 is shaped like a ring, and is generally coupled to an outer circumference of an input shaft of a steering system to be rotated along with the input shaft.

Further, a stator (not shown) is connected to an output shaft to be rotated along with the output shaft.

It can be understood that torsion occurs when there is a difference in rotation amount between the input shaft and the output shaft due to resistance of a wheel. The difference is measured using a magnetic field as described above. Of course, the magnet 20 may be connected to the output shaft, and the stator may be connected to the input shaft.

The rotor 10 includes a rotor body and the ring-shaped magnet 20. The rotor body includes a ring-shaped yoke 30 that protrudes outwards from a lower end of a sleeve 40 taking a shape of a hollow cylinder. The magnet 20 is coupled to an outer circumference of the rotor body. To be more specific, the magnet 20 is coupled to an outer circumference of the yoke 30.

As described above, an inner circumference of the sleeve 40 is connected to a rotating shaft of the steering system to be rotated along with the rotating shaft.

Further, the yoke 30 is coupled to the sleeve 40 to support the magnet 20 and thereby rotate along with the sleeve 40. However, the yoke 30 may be integrated with the sleeve 40.

Preferably, the magnet 20 comprises two or more magnet segments that are to be connected to each other. To be more specific, a plurality of arc-shaped magnet segments forms the ring-shaped magnet 20.

The rotor 10 is coupled to the rotating shaft of the steering system by fitting the rotor 10 over the rotating shaft starting from a lower portion of the sleeve 40, and a torque center is adjusted by an additional device, a jig.

According to the present invention, the rotor body has a shape to allow rotating power to be reliably transmitted between the jig and the rotor 10, thus inhibiting slipping between the rotor body and the jig when the torque center is adjusted, and thereby enabling a precise adjustment. Such a shape may be implemented by various embodiments of anti-slip structures, for example, a structure for increasing a frictional force between contact portions, such as a serration or a micro groove, or a structure for providing a mechanical coupling force, such as a hole or a recess.

Thus, as a first embodiment for increasing a rotating frictional force, a serrated portion 31 is formed on an upper end of the yoke 30.

The serrated portion 31 is circumferentially formed on an upper surface of the yoke 30 protruding outwards from a lower end of the sleeve 40, thus having an uneven shape. It is preferable that the uneven shape be a wedge shape to allow the serrated portion 31 to be easily coupled to the jig.

In this case, a lower end of the jig is brought into contact with an upper end of the uneven serrated portion 31 to transmit a rotating force.

Further, as a second embodiment for increasing a frictional force, an uneven portion may be formed on the upper surface of the yoke 30.

The uneven portion may be formed by fine line-shaped grooves, or may comprise a single protrusion or a plurality of protrusions. In an example of FIG. 4, the uneven portion is formed by a plurality of diagonal line-shaped grooves.

Similarly to the first embodiment, the second embodiment provides a frictional force when a lower end of a jig comes into contact with the upper surface of the yoke 30.

Further, as a third embodiment for increasing a frictional force, a hole 42 is formed in a side surface of the sleeve 40.

Preferably, the hole 42 is formed in the side surface of the sleeve 40 making contact with the jig, and a protrusion is formed on a portion of the jig to be fixedly inserted into the hole 42.

According to a shape of the jig, a single hole or a plurality of holes may be formed in the side surface of the sleeve 40.

Meanwhile, the hole 42 may be replaced by a recess, a fine line-shaped groove, a single protrusion or a plurality of protrusions.

Further, as a fourth embodiment for increasing a frictional force, a depression may be formed in an upper end of the sleeve 40.

The depression is depressed downwards from the upper end of the sleeve 40. In this case, the jig comes into contact with the upper end of the sleeve 40 and includes a protrusion that may be inserted into the depression, thus maximizing a frictional force therebetween.

The above embodiments for increasing the frictional force may be selectively applied, but two or more embodiments may combine with each other.

For example, both the serrated portion 31 of the yoke 30 and the hole 42 of the sleeve 40 may be formed, and the jig may be disposed to be in contact with both the upper surface of the yoke 30 and the side surface of the sleeve 40. In this case, since a frictional force between contact surfaces of the rotor 10 and the jig is maximized, a center adjusting operation can be precisely performed.

Figure 3:
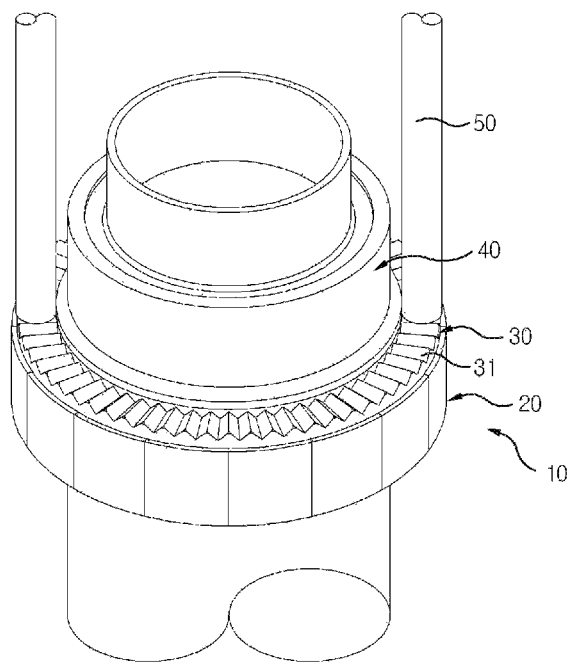
FIG. 3 is a perspective view showing a coupling of a jig and a rotor for a torque sensor according to an embodiment of the present invention.

FIG. 3 is a perspective view showing a coupling of a jig and a rotor for a torque sensor according to an embodiment of the present invention.

While the torque center of the rotor for the torque sensor is adjusted, the lower end of the jig 50 comes into contact with the upper surface of the yoke 30 in a state in which the rotor 10 is coupled to an outer circumference of the rotating shaft.

Since the serrated portion 31 is formed on the upper surface of the yoke 30 and a serrated portion is also formed on the lower end of the jig 50 to correspond to a shape of the serrated portion 31, a rotating force can be precisely transmitted between the yoke 30 and the jig 50.

Figure 4:
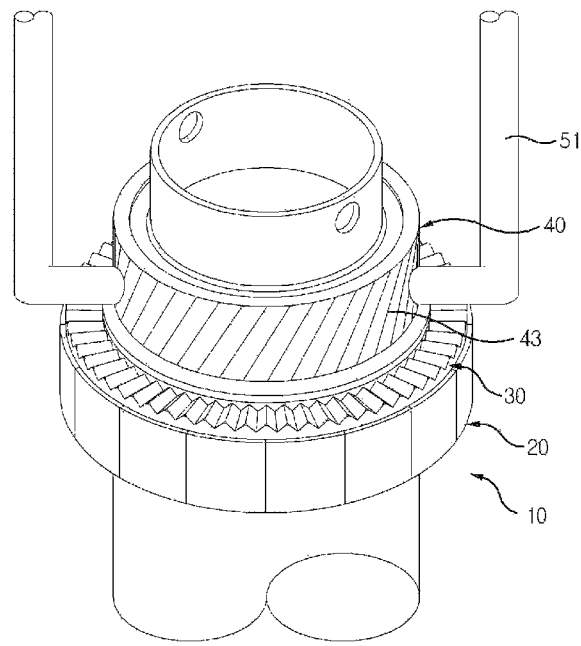
FIG. 4 is a perspective view showing a coupling of a jig and a rotor for a torque sensor according to another embodiment of the present invention.

FIG. 4 is a perspective view showing a coupling of a jig and a rotor for a torque sensor according to another embodiment of the present invention.

Unlike the embodiment of FIG. 3, a jig 51 comes into contact with the side surface of the sleeve 40.

A diagonal line-shaped knurled portion 43 is formed on the side surface of the sleeve 40. The knurled portion 43 increases a frictional force at a contact portion between the sleeve 40 and the jig 51, thus allowing a rotating force to be precisely transmitted.

Of course, as described above, the knurled portion 43 may be replaced by a hole 42 or a protrusion.

According to the above embodiment, the jig comprises two long bars. However, the jig may be selected from various shapes including one bar and a ring, as long as it may transmit a rotating force to the rotor and adjusts the center.

The present invention provides various structures for precisely transmitting a rotating force by increasing a frictional force at a portion coupled with a jig when a center of a rotor of a torque sensor is adjusted. Thus, a fine adjustment of the torque center is possible. This improves operational reliability of a steering system.

The present invention has been described with reference to embodiments and the accompanying drawings. However, it is to be understood that the scope of the invention is not limited by the specific embodiments and drawings except as defined in the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rotor for a torque sensor comprising:
   a rotor body comprising a sleeve coupled to a rotating shaft;
   a magnet disposed at the rotor body; and
   an anti-slip structure formed at the rotor body, wherein the anti-slip structure is configured to transmit an external rotating force to the rotor body when a torque center is adjusted.

2. The rotor of claim 1, wherein the anti-slip structure comprises a knurled portion formed on an outer circumferential surface of the sleeve.

3. The rotor of claim 1, wherein the anti-slip structure comprises a hole formed in the outer circumferential surface of the sleeve.

4. The rotor of claim 1, wherein the anti-slip structure comprises a groove formed in an upper end of the sleeve.

5. The rotor of claim 2, wherein the rotor body comprises a yoke disposed between the sleeve and the magnet, and the anti-slip structure comprises a serrated portion formed on an upper end of the yoke in a circumferential direction thereof.

6. The rotor of claim 3, wherein the rotor body comprises a yoke disposed between the sleeve and the magnet, and the anti-slip structure comprises a serrated portion formed on an upper end of the yoke in a circumferential direction thereof.

7. The rotor of claim 4, wherein the rotor body comprises a yoke disposed between the sleeve and the magnet, and the anti-slip structure comprises a serrated portion formed on an upper end of the yoke in a circumferential direction thereof.

8. The rotor of claim 1, wherein the anti-slip structure is in contact with a portion of a jig during a rotating process for adjusting the torque center, thereby inhibiting slipping between the rotor body and the jig when a rotating force of the jig is transmitted.

9. A torque sensor comprising:
   a stator coupled to a first shaft; and
   a rotor coupled to a second shaft and disposed in the stator,
   wherein the rotor comprises a rotor body including a sleeve coupled to the second shaft, a magnet disposed at the rotor body, and an anti-slip structure disposed at the rotor body,
   wherein the anti-slip structure is configured to transmit an external rotating force to the rotor body when a torque center is adjusted.

10. The torque sensor of claim 9, wherein the anti-slip structure comprises a knurled portion formed on an outer circumferential surface of the sleeve.

11. The torque sensor of claim 9, wherein the anti-slip structure comprises a hole formed in the outer circumferential surface of the sleeve.

12. The torque sensor of claim 9, wherein the anti-slip structure comprises a groove formed in an upper end of the sleeve.

13. The torque sensor of claim 10, wherein the rotor body comprises a yoke disposed between the sleeve and the magnet, and the anti-slip structure comprises a serrated portion formed on an upper end of the yoke in a circumferential direction thereof.

14. The torque sensor of claim 11, wherein the rotor body comprises a yoke disposed between the sleeve and the magnet, and the anti-slip structure comprises a serrated portion formed on an upper end of the yoke in a circumferential direction thereof.

15. The torque sensor of claim 12, wherein the rotor body comprises a yoke disposed between the sleeve and the magnet, and the anti-slip structure comprises a serrated portion formed on an upper end of the yoke in a circumferential direction thereof.

16. The torque sensor of claim 9, wherein the anti-slip structure is in contact with a portion of a jig during a rotating process for adjusting the torque center, thereby inhibiting slipping between the rotor body and the jig when a rotating force of the jig is transmitted.

* * * * *